United States Patent [19]
Escobosa et al.

[11] Patent Number: 6,147,677
[45] Date of Patent: Nov. 14, 2000

[54] SENSING AND CONTROL DEVICES USING PRESSURE SENSITIVE RESISTIVE ELEMENTS

[75] Inventors: Marcus Escobosa, Placentia; Robert Campbell, Costa Mesa; Fusheng Frank Chen, Anaheim; Patrick H. Hayes, Mission Viejo, all of Calif.

[73] Assignee: Universal Electronics Inc., Cypress, Calif.

[21] Appl. No.: 09/038,626

[22] Filed: Mar. 10, 1998

[51] Int. Cl.[7] .................................................... G09G 5/08
[52] U.S. Cl. ........................ 345/158; 345/156; 345/163
[58] Field of Search .................................. 345/156, 157, 345/158, 161, 163, 184; 341/34; 338/95; 200/182; 340/825.5, 825.72

[56] References Cited

U.S. PATENT DOCUMENTS

| | | |
|---|---|---|
| 4,445,011 | 4/1984 | Hansen . |
| 5,278,557 | 1/1994 | Stokes et al. ............................ 341/34 |
| 5,302,936 | 4/1994 | Yaniger . |
| 5,363,120 | 11/1994 | Drumm . |
| 5,528,265 | 6/1996 | Harrison . |
| 5,541,570 | 7/1996 | McDowell . |
| 5,554,980 | 9/1996 | Hashimoto et al. . |
| 5,561,445 | 10/1996 | Miwa et al. . |
| 5,689,285 | 11/1997 | Asher ..................................... 345/161 |
| 5,703,623 | 12/1997 | Hall et al. .............................. 345/158 |
| 5,790,102 | 8/1998 | Nassimi ................................. 345/163 |
| 5,912,612 | 6/1999 | DeVolpi .................................. 338/95 |

*Primary Examiner*—Steven J. Saras
*Assistant Examiner*—Fritz Alphonse
*Attorney, Agent, or Firm*—Mark R. Galis

[57] ABSTRACT

A device for providing input information such as the position and movement of a cursor or pointer to a control for a visual display screen having a gravity responsive member mounted in a housing having a plurality of force sensitive resistive elements mounted in spaced relation to one another said gravity responsive member being mounted in position to selectively apply pressure on said resistive elements in response to the orientation of said housing.

12 Claims, 5 Drawing Sheets

SENSING AND CONTROL DEVICES USING PRESSURE SENSITIVE RESISTIVE ELEMENTS

BACKGROUND OF THE INVENTION

Various types of devices are presently in use to sense and control the movement of cursors, pointers and other objects on computer screens, both in games and application software. These sensing and control devices include various forms of joystick, mouse and trackball devices. Such devices provide a simulated movement on the screen in response to a relative change in the position of parts on the device, for example, movement of a ball in a mouse or trackball.

The present invention is related to devices providing orientation-operated computer cursor sensing and control in which the devices include a hand-held housing that carries an orientation maintaining member. The orientation maintaining member will tend to maintain its absolute orientation relative to a gravitational frame of reference when the housing is rotated or tilted into varying orientations. Relative rotation of the housing and orientation maintaining member is detected such as by encoders that generate input information for the associated computer in response to said rotation.

The inventive device provides raw signal information based upon the pressure developed on the sensing resistive elements that is processed and combined by suitable circuitry for communication to the computer or control console. Thereafter, the signals are processed by software in the computer driver, and then used to provide input to other software programs, as is well known in the art.

Various complex control devices have recently been proposed particularly for use in more complex screen displays such as virtual reality systems. Most of these devices rely on relatively complicated sensor arrangements and many employ complex triangulation methods to locate the operated part within a limited field. These devices include mercury type contact switches that are responsive to gravitational orientation.

For example, U.S. Pat. No. 5,528,265 discloses a cursor control device including spheres mounted in gimbal-like arrangement to provide orientation information. U.S. Pat. No. 5,561,445 discloses a trackball sensor. U.S. Pat. No. 5,363,120 discloses an orientation sensor wherein the control response is provided by the position of light sources relative to a transparent fluid in a container. U.S. Pat. No. 4,445,011 discloses a prior art type of joystick device which include tilt switches adapted to detect movement of the joystick in various orientations.

The present invention relates to relatively simplified sensing and control devices; the devices are hand-held enabling a user or operator to freely manipulate a device that is sensitive to gravitational orientation. More particularly, the invention pertains to such gravity sensitive devices that provide information based upon the response of pressure sensitive resistive elements. Pressure on the resistive elements is effected by relative movement of an associated moveable body. The inventive devices are used for cursor or pointer control, sensing and/or tracking on visual displays, control input for games, and are useful such as for interactive television and computer systems, and for visual tracking control in virtual reality systems.

Certain types of pressure sensitive resistors are known, for example U.S. Pat. Nos. 5,541,570 and 5,302,936 disclose such resistors.

The software and electronic circuitry including the programming, encoders, and decoders used in connection with the present invention are well known in the art from many sources, and need not be explained in detail. Note, for example the above cited U.S. Pat. No. 5,554,980.

SUMMARY OF THE INVENTION

The invention pertains to cursor control and sensing devices which provide outputs based upon pressure sensitive elements such as film resistors. The film resistors provide outputs based upon the pressure developed on the resistor such as by the force of a moveable weighted member such as a joystick, or by pressure induced by movement of a moveable member in a container that houses the resistors. The container is selectively tilted or moved to provide a pressure on the resistors by gravitational forces; i.e., the device is orientation sensitive.

The foregoing features and advantages of the present invention will be apparent from the following more particular description of the invention. The accompanying drawings, listed hereinbelow, are useful in explaining the invention.

DESCRIPTION OF THE INVENTION

Figure 1:
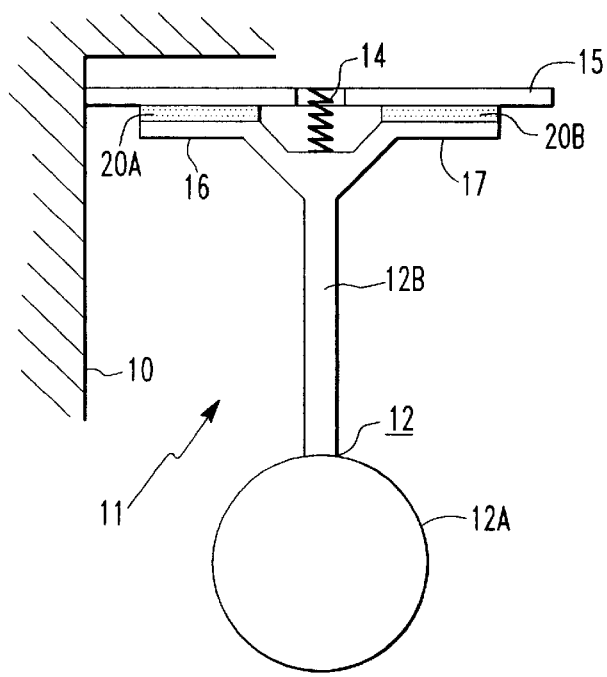
FIG. 1 is a schematic side view of the device in accordance with the invention with an included pendulum; the pendulum is shown in perpendicular orientation relative to gravity.

In the embodiment of the invention shown in FIG. 1, the inventive cursor or pointer sensing and control device 11 comprises a hand-held housing 10 of any suitable known design, a pendulum 12 comprising a weight providing member 12A and hanger arm 12B which are mounted such as by a coil spring 14 onto a position adjacent a platform 15. The pendulum 12 is hung from a coil spring 14 such that it can swing freely in both the X and Y axes. The pendulum 12 includes extending arms 16 and 17 which extend adjacent to the lower surface of platform 15, that is, arms 16 and 17 are substantially parallel to the plane of platform 15. Pressure resistive elements generally labeled as 20 are mounted on the underside surface of platform 15, intermediate the pendulum arms 16 and 17. For purpose of clarity in the drawings, the particular attaching and mounting brackets and fasteners, which are well known, are not shown in the drawings.

Figure 10:
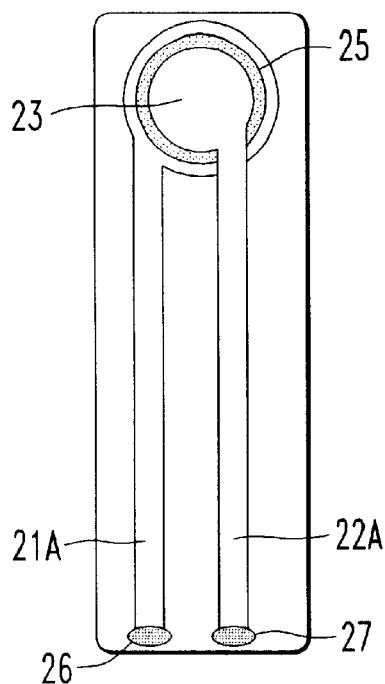
FIG. 10 labeled prior art shows typical resistive pressure sensor components used in the present invention.
Figure 10A:
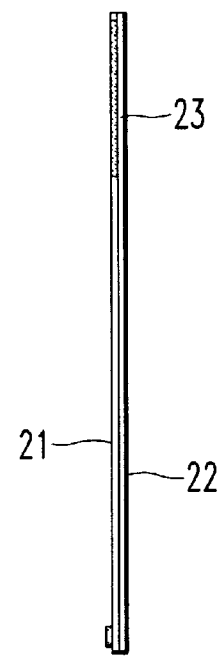
FIG. 10A, also labeled prior art, is a side view of the sensor of FIG. 10.

FIGS. 10 and 10A, labeled prior art, show the structure of the resistive elements 20. Each resistive element 20 comprises two layers of plastic film, each with a layer of conductive material 21 and 22 which sandwich a disc of pressure sensitive resistive material 25. The sensor area 23 is the area where pressure is effected to change the materials 21 and 22 are connected to respective electrical connection points 26 and 27 via conductive portions 21A and 22A. The devices of the invention use sensors made by Force Imaging Technologies, Inc.; however, other types of resistive pressure sensors are available from other manufacturers.

Figure 2A:
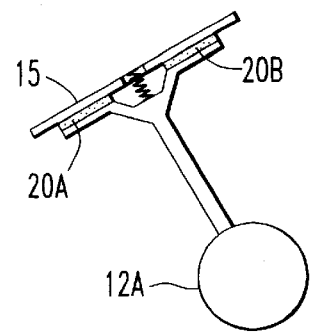
FIGS. 2A and 2B depict the device of FIG. 1 in an angled orientation relative to gravity.
Figure 2B:
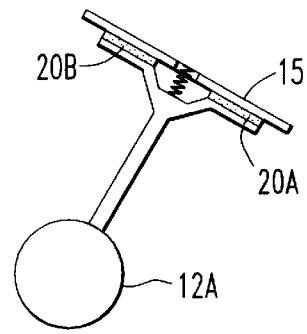

FIG. 2A and 2B show the tilting or orientation of the platform 15 relative to gravity and depict the unequal pressures developed on the sensors 20A and 20B, such as along the X-axis. As will be appreciated, in the orientation shown in FIG. 2A, a larger pressure will be developed on resistive component 20A; and, in the orientation or tilt shown in FIG. 2B, a larger pressure will be developed on resistive component element 20B. The unequal pressures provide information which enable a ratio calculation to be made to establish the direction and tilt of the platform 15, and to provide an output to enable the associated electronic circuitry encoder 39, indicated in FIG. 11, to develop a data signal for positioning a cursor or pointer 44.

Figure 3:
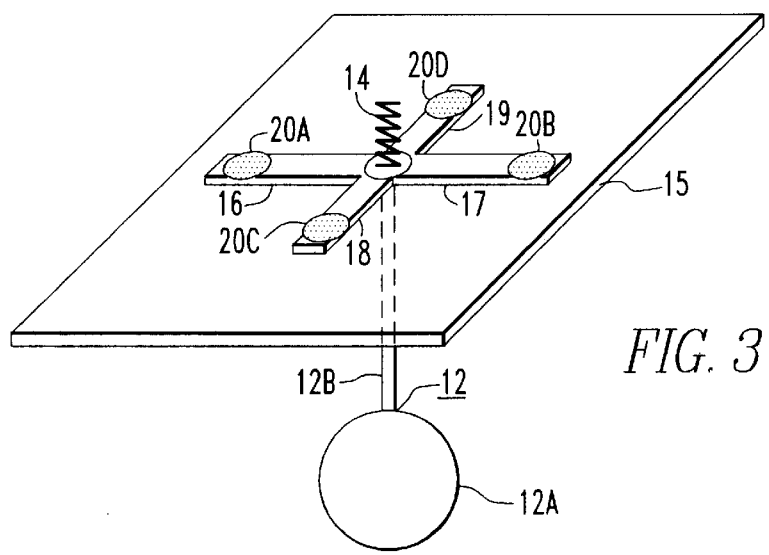
FIG. 3 shows a top isometric view of the inventive device to show the resistive elements mounted in a quadrature relation to provide information for two axes.

FIG. 3 is an isometric view of the sensing and control device 11 intended to depict the structure of the pendulum 12 including arms 16 and 17 to provide responses on the X-axis, and arms 18 and 19 associated with resistive elements 20C and 20D to provide responses on the Y-axis. The operation of arms 20C and 20D in the Y-axis with the respective resistive elements is the same as that for arms 16 and 17 in the X-axis. As is known, the ratio calculation from the resistive elements 20A and 20B is combined with the ratio calculation from the resistive elements 20C and 20D to provide a result which is processed by the electronic circuitry and the encoders 39, see FIG. 11.

Figure 11:
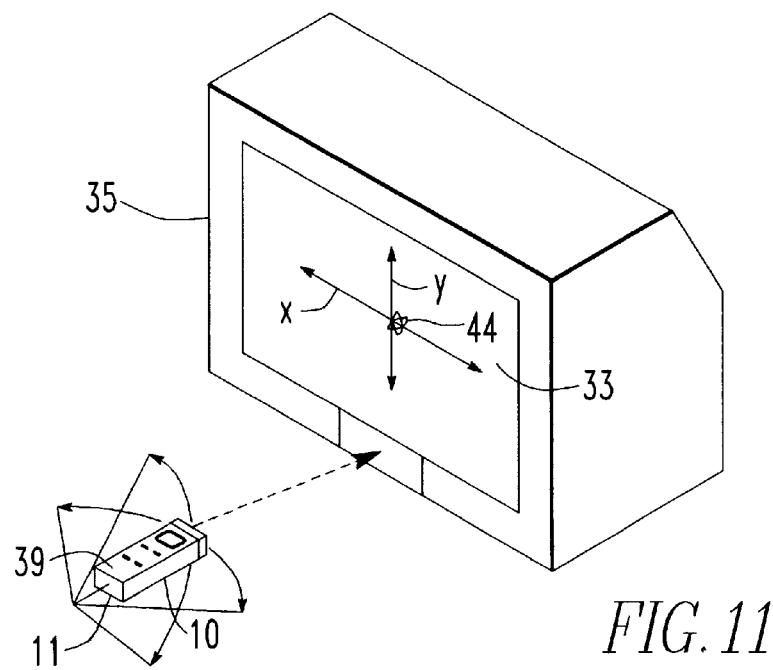
FIG. 11 is a view of the device of the present system as associated with a screen display.

FIG. 11 depicts a system including a display screen 33 wherein the invention may be utilized. Note that for a wireless remote unit, electronic circuitry including an encoder 39 can be provided in the housing of the device 11. In a wired system, that is, where the device 11 is connected by wire leads to the computer or display console 35, the electronic circuitry and encoder can be located in the computer or display console.

Figure 4:
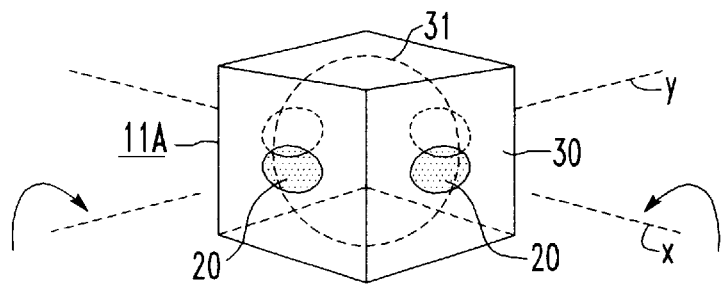
FIG. 4 is a schematic isometric view of a second embodiment of the invention comprising a weight providing sphere mounted within a cubical container.
Figures 5, 5A:
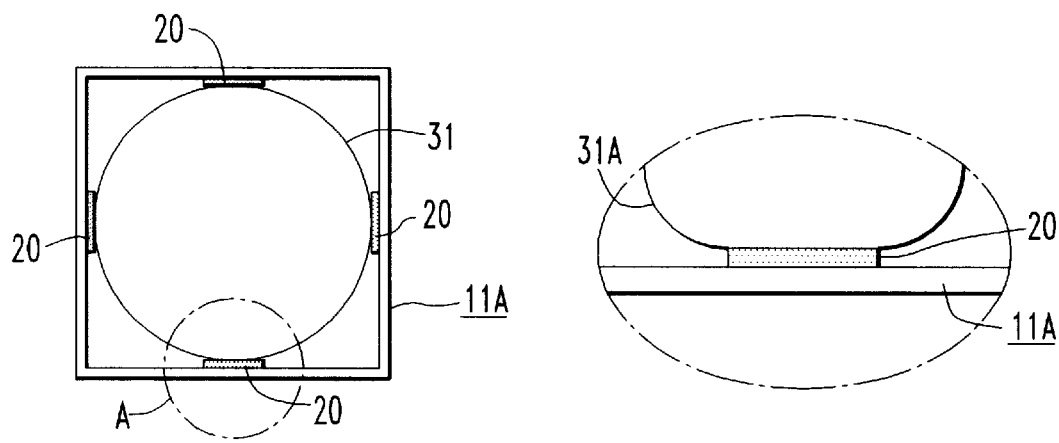
FIG. 5 shows a top view of the device of FIG. 4 showing the positioning of the resistive elements.
FIG. 5A is an enlarged view of a modification of section labeled A' of FIG. 5.

FIGS. 4, 5 and 5A show a second embodiment of the invention. In FIG. 4, the inventive device 11A comprises a box-like or cube-like housing 30. A captive, weight providing, sphere 31 is mounted within the housing 30, and provides a moveable and pressure creating element. Resistive elements 20 are mounted on four inside surfaces of the housing 30, as shown in FIG. 5. The sphere 31 fits inside the housing 30 with minimum clearance. That is, the sphere 31 is designed to lightly contact the resistive elements 20, but it is loose enough so that it can transfer pressure to one or more of the resistive elements 20 dependent on the orientation of the housing 30. Similarly, as in the embodiment of FIG. 1., the tilting of the housing 30 about the two axes produces change in the resistive values of the elements 20.

Figure 6:
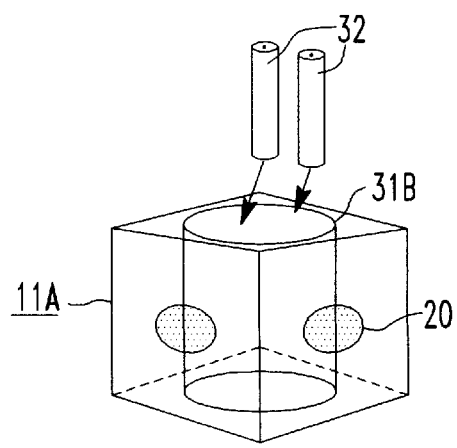
FIG. 6 shows another embodiment of the invention to show that the weight element can be other than a sphere.

FIG. 6 shows a variation of the moveable body member 31 which is in the form of a cylinder 31B. Batteries 32 for powering the device are used to provide all or part of the necessary weight for the cylinder 31B. It has been found that the moveable member 31 can be of any suitable arbitrary shape designed to optimize the area of contact with the resistive sensing elements.

Figure 7:
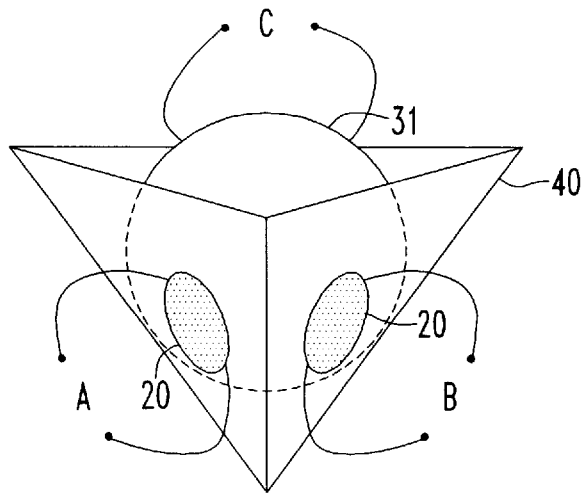
FIG. 7 shows yet another embodiment of the invention wherein the housing comprises a triangular housing in the form of an inverted pyramid.

FIG. 7 shows another embodiment of the invention wherein the housing 40 for the moveable body member 31C comprises a triangular body in the form of an inverted pyramid. This is in effect a modification of the embodiment of FIG. 4. Three resistive elements 20 are mounted on three respective inside surfaces of the pyramid housing 40. The shape of the housing 40 allows three sensors to be used instead of the four sensors as in FIGS. 4–6. As can be appreciated from FIG. 7, the third resistive element is indicated by the letter C on the reverse side of the pyramid.

Figure 8A:
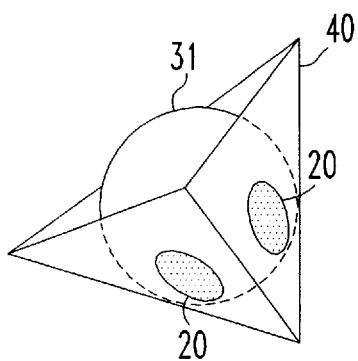
FIGS. 8A and 8B depict the relative positioning of the device of FIG. 7 which provides horizontal orientation information.
Figure 8B:
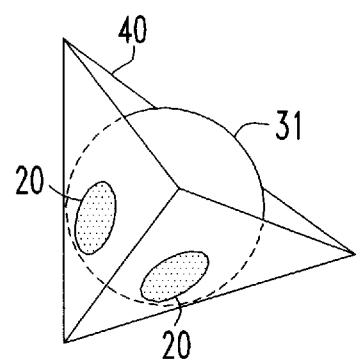
Figure 9A:
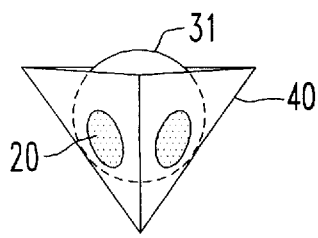
FIG. 9A and 9B depict the relative positioning of the device of FIG. 7 which provides vertical orientation information.
Figure 9B:
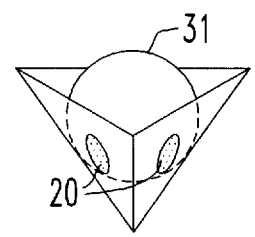

FIGS. 8A and 8B indicate that horizontal orientation is calculated from a ratio of the resistance of resistive element 20A to the resistance of resistive element 20B. FIGS. 9A and 9B indicate that vertical orientation is calculated from the ratio of the resistance of element 20C to the resistance of elements 20A plus 20B (20A+20B). Well known electronic circuitry and/or programs are used for this purpose.

Figure 12:
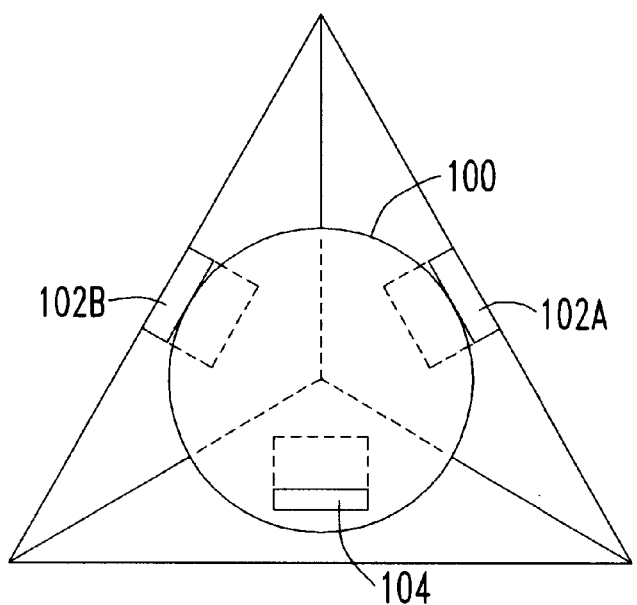
FIG. 12 is a plane view of an embodiment of the device with two sensors.

FIG. 12 shows a ball 100 supported by two force sensors 102A and 102B such that the sensors 102A and 102B are actually under the ball 100 and completely support all of the balls weight.

The sum of the weight on the sensors 102A and 102B and support 104 is constant since the ball's 100 weight is constant. Therefore, the weight of the ball 100 seen by the support 104 equals the ball weight minus (sensor 102A and sensor 102B) multiplied by the weight.

Figure 13A:
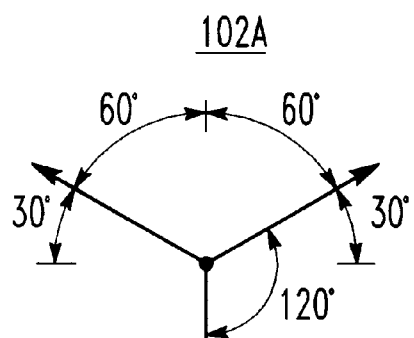
FIG. 13 shows the trigonometrical relationship of forces for the device shown in FIG. 12.
Figure 13B:
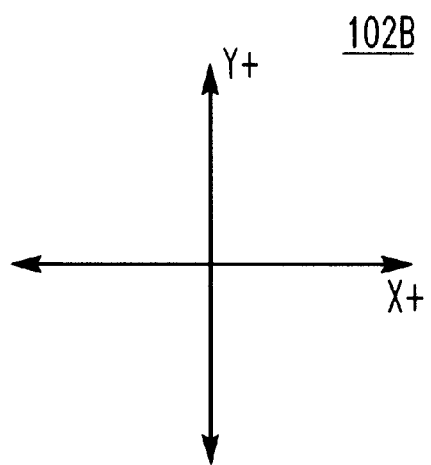

As the device is tilted, the weight seen by the sensors 102A and 102B will change. The direction and magnitude is calculated trigonometrically, as shown in FIG. 13, from the force seen by the sensors as follows:

x axis
x=52 cos (30)−51 cos (30)
=0.866 (52−51)
y axis
y=51 cos (60)+52 cos (60)=[BW−(51+52)]
0.5 (51+52)−BW+51+52
=1.5 (51+52)−BW 51 and 52 represent the force the ball exerts on the force sensors 102A and 102B and BW is equal to the ball 100 weight, x and y are the force vectors representing the horizontal and vertical positioning of the device.

While the invention has been particularly shown and described with reference to a particular embodiment thereof it will be understood by those skilled in the art that various changes in form and detail may be made therein without departing from the spirit and scope of the invention.

What is claimed is:

1. A control device comprising:
   a housing including a platform on which a plurality of resistive, force sensitive, elements are mounted in fixed relation, wherein the platform is positioned in an orientation; and a pendulum mounted in the housing and responsive to changes of the orientation of said platform, the pendulum including outwardly extending arms positioned to effect selective pressure on the resistive elements in response to chances of the orientation of the platform.

2. The device of claim 1, wherein the pendulum is mounted to extend below said platform and said arms extend to respective positions adjacent respective resistive elements.

3. The device of claim 1, further including electronic means to provide signal outputs indicative of the orientation of the platform relative to the pendulum.

4. The device of claim 1, wherein the pendulum includes four quadrilateral arms having respective ends, and wherein the resistive elements are mounted on the ends of the arms.

5. The device of claim 1, further comprising a coil spring mounting the pendulum to the housing.

6. A device for sensing and controlling movements comprising:
a. a triangular container including an inverted pyramid having three sides;
b. a plurality of pressure sensitive resistive elements mounted in spaced relation to one another along the sides of the container and approximately in a plane along a center of the sides; and
c. a moveable body of selected weight mounted within the container, and in close contact with the sides of the container such that the body is in contact with the resistive elements, and wherein the body provides respective selective forces on one or more of the resistive elements, the selective forces being dependent on an orientation of the container relative to gravity, and wherein an horizontal orientation is calculated from a resistive ratio of the resistive element of a first side of the three sides to the resistive element on a second side of the three sides, and wherein a vertical orientation is calculated from a ratio of a resistive element of a third side of the three sides to a sum of the resistive element of the first side and the resistive element of the second side.

7. A control device comprising:
a. a hand-held housing having at least three interior surfaces;
b. resistive, force sensitive, elements mounted to said interior surfaces;
c. a captive weighted body captured in the housing to create a force on at least one of the resistive, force sensitive, elements upon tilting of the housing; and
d. means for providing an output control signal based upon a resultant force measured by the resistive, force sensitive, elements.

8. The control device of claim 7, wherein the interior surfaces form a cube.

9. The control device of claim 7, wherein the captive weighted body is entirely enclosed in the housing.

10. The control device of claim 7, wherein the captive weighted body comprises a pendulum.

11. The control device of claim 7, wherein the captive weighted body comprises a weighted portion including a battery.

12. The control device of claim 7, wherein the means for providing an output control signal comprises means for providing wireless control.

* * * * *